United States Patent [19]

Costanza et al.

[11] 4,003,871

[45] Jan. 18, 1977

[54] HIGH SOLIDS STYRENE-BUTADIENE EMULSIONS

[75] Inventors: John R. Costanza, North Plainfield, N.J.; Ellsworth E. Faust, Yardley, Pa.

[73] Assignee: Celanese Corporation, New York, N.Y.

[22] Filed: Jan. 8, 1975

[21] Appl. No.: 539,470

[52] U.S. Cl. .................. 260/29.7 R; 260/29.7 SQ
[51] Int. Cl.² ....................................... C08L 47/00
[58] Field of Search ............... 260/29.7 R, 29.7 SQ

[56] References Cited

UNITED STATES PATENTS

| | | | |
|---|---|---|---|
| 3,306,871 | 2/1967 | Miller | 260/29.7 SQ |
| 3,313,748 | 4/1967 | Burke, Jr. | 260/29.7 SQ |
| 3,356,659 | 12/1967 | Hagemeyer, Jr. et al. | 260/29.7 SQ |
| 3,506,602 | 4/1970 | Floros et al. | 260/29.7 R |
| 3,637,563 | 1/1972 | Christena | 260/29.6 R |

Primary Examiner—M. J. Welsh

[57] ABSTRACT

An improved process for preparing high solids predominantly styrene-butadiene copolymer aqueous emulsions is disclosed which process comprises pre-emulsifying a portion of the monomers to be used in forming the copolymer and adding the resulting pre-emulsion to a mixture of the remainder of the monomers, all maintained at an aqueous solids content between about 50 and 75 weight percent, utilizing as initiators about 0.1 to about 2.0 percent, by weight, based upon the total monomer weight, of a lypophillic initiator and about 0.01 to about 0.2 percent, by weight on the same basis, of a hydrophillic initiator.

8 Claims, No Drawings

4,003,871

HIGH SOLIDS STYRENE-BUTADIENE EMULSIONS

BACKGROUND OF THE INVENTION

This invention relates to polymer emulsions, more particularly to a novel process for preparing stable aqueous polymer emulsions of low viscosities having higher solids contents than were heretofore obtained by using conventional emulsion polymerization techniques.

Aqueous emulsions of styrene-butadiene type copolymers have been known for many years. Generally, the procedures utilized to prepare such emulsions involve the addition with rapid stirring of one or more of the monomers to water simultaneously with, or subsequent to, the addition of surfactants, emulsifying agents, polymerization catalysts or initiators, and, in many instances, a protective colloid-forming substance. The mixture is held at polymerization temperature until complete polymerization of the monomers has occurred. The resulting copolymer emulsion, upon cooling and filtering, can be used in many applications such as paints, coatings, adhesives, binders, caulking compositions and the like.

U.S. Pat. No. 3,637,563 has disclosed a novel process for the preparation of aqueous emulsions, wherein it is possible to achieve, in most instances, polymer solids contents in excess of about 50 percent, by weight, with attendant low viscosities and shelf stability.

However, the process disclosed in this invention has not been entirely successful in achieving extremely high solids, low viscosity aqueous emulsions utilizing styrene and butadiene as the predominant copolymerizing monomers. Furthermore, at solids contents of near 75 weight percent, it has been especially difficult to prepare low viscosity, shelf-stable polymers according to the process disclosed.

Thus, it is an object of the present invention to provide a process for preparing predominantly styrene-butadiene copolymer emulsions.

It is also an object of this invention to provide a process for preparing styrene-butadiene copolymer emulsions having extremely high solid contents, but handleable viscosities. These and other objectives are obtained by preparing polymers according to the process disclosed hereinafter.

SUMMARY OF INVENTION

The instant invention involves an improvement on a process for producing high solids aqueous copolymer emulsions which is particularly useful in preparing predominantly styrene-butadiene emulsions. The prior art process comprised forming an aqueous monomer pre-emulsion in the presence of the non-ionic or anionic surfactant utilized and between about 3 and 50 percent of water, based upon the total weight of the monomer; adding the resulting pre-emulsion to a polymerization reaction medium comprising initially a free radical polymerization catalyst and water; and completing the polymerization. The improvement on this process as disclosed herein comprises utilizing as the main catalyst (65 weight percent or more of the total catalyst utilized) a mixture of about 0.1 to about 2.0 percent, by weight, based on the total monomer content, of a lypophillic initiator and about 0.01 to about 0.2 percent, by weight, on the same basis, of a hydrophillic initiator.

By utilizing this process it is possible to obtain shelf-stable, aqueous styrene-butadiene copolymer emulsions having remarkably high solids levels.

DETAILED DESCRIPTION OF INVENTION

The modified process disclosed in this invention is generally referred to as a modified high solids technique. It basically comprises forming a pre-emulsion and adding the pre-emulsion to a reaction medium.

The pre-emulsion is formed by combining:

a. one or more polymerizable monomers, each containing at least one olefinic double bond;

b. sufficient amounts of at least one surfactant to provide a stable pre-emulsion and subsequently a stable copolymer emulsion; and c. water in an amount corresponding to between about 3 and about 50 percent, by weight, based on the total weight of the monomer in the pre-emulsion.

The monomer or monomers utilized must be capable of not only polymerizing, but of forming a stable aqueous emulsion, i.e., a stable emulsion in which water is dispersed as a discontinuous phase in a continuous phase of monomer or mixture of monomers.

The pre-emulsion prepared above is then added incrementally or continuously to the polymerization reaction medium comprising an amount of water which is necessary to obtain the high solids content desired in the polymer emulsion product. A portion of a free radical polymerization catalyst as described hereinafter, in a total amount sufficient to initiate the polymerization of at least one or more of the polymerizable monomers in the pre-emulsion, is also added. The reaction medium is maintained at a temperature which will initiate and maintain the polymerization reaction, considering the nature of the initiator and the monomers. The rate of addition of the pre-emulsion is controlled to provide essentially complete conversion of the monomer to a polymer as the pre-emulsion is added.

The monomer pre-emulsion of the present invention containing the styrene and butadiene monomers, in addition to the other desired monomers, if any, in percentage ranges as set out hereinafter, is preferably prepared by first admixing a surfactant or surfactant mixture with water and then adding the monomer mixture thereto with stirring. The monomers should be added to the surfactant-water mixture at a rate such that the monomer pre-emulsion will continuously form, while at the same time avoiding the build-up of unemulsified monomer in the surfactant-water mixture. While the precise rate of addition will vary from system to system, in general the monomer is added more slowly at first and then more rapidly as the preparation progresses.

The term "stable pre-emulsion" as used herein is defined as a monomer pre-emulsion which will maintain the emulsion properties at least long enough to permit the addition of the pre-emulsion to the polymerization reaction medium and preferably as long as 6 months or more.

The total monomer content of the monomer pre-emulsion of the present invention can range from about 65 to about 94 percent, by weight, and preferably about 75 to about 90 percent, by weight, based on the total weight of the monomers. It has been discovered that the amount of water employed in preparing monomer pre-emulsions for use in the novel process of the present invention will generally be between about 0.9 mole and about 1.9 moles for each mole of monomer present. This corresponds to between about 6 and about 25 weight percent of water, based on the total weight of monomer present in the pre-emulsion. Preferably the amount of water ranges from about 10 to about 25 weight percent based on the total monomer present in the pre-emulsion.

The amount of non-ionic or anionic surfactant or mixture thereof employed in preparing the monomer pre-emulsion is generally that amount conventionally employed when emulsifying monomers in an emulsion polymerization process, e.g., an amount ranging from about 1 to about 10 percent, by weight, based on the total weight of the monomer. However, it is preferred when using typical non-ionic surfactants, e.g., those of the hereinafter-described alkyl-phenoxypoly(ethyleneoxy) ethanols which contain from about 4 to about 240 ethyleneoxy units or typical anionic surfactants, e.g., an ethoxylated higher fatty alcohol which has also been sulfonated, to employ them in amounts ranging from about 1.5% to about 6% by weight, on the above-stated basis.

Aside from the surfactant or surfactant mixture employed, the monomer material to be used in making the pre-emulsion can also contain small amounts of one or more protective colloids. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., those containing no ether linkages, can also be used, either alone or together with the aforementioned ether linkage-containing materials, and included among these are partially and fully hydrolyzed polyvinyl alcohols, polyacrylic acid, sodium and other alkali metal polyacrylates, polyacrylamide, poly(methylvinyl ether/maleic anhydride), polyvinylpyrrolidone, water-soluble starch, glue, gelatin, water-soluble aliginates, such as sodium or potassium aliginate, casein, agar, and natural and synthetic gums, such as gum arabic and gum tragacanth. All of these materials can be used in amounts conventionally used in emulsion polymerization procedures, i.e., in amounts usually ranging from about 0.1 to about 2 percent, by weight, of the polymer emulsion.

No particular temperature range is required when preparing the monomer pre-emulsions of the present invention. In fact, in most, if not all, cases the monomer pre-emulsion is preferably prepared at or near ambient temperature, i.e., between about 10° C. and about 40° C.

As previously set forth, sufficient surfactant should be added to the monomer pre-emulsion so that a stable high solids polymer emulsion will result. Generally, this means about 1.0 to about 10 percent, by weight, based on the total weight of the monomers, of a surfactant or surfactant system. The surfactants should be non-ionic or anionic in nature.

Among the non-ionic surfactants suitable for use in the present invention are polyethers, e.g., ethylene oxide and propylene oxide condensates in general, which include straight- and branched-chain alkyl and alkylaryl polyethylene glycol ethers and thioethers and polypropylene glycol ethers and thioethers, and more particularly substances such as the "Igepals," which is a trademark of General Aniline and Film Corporation denoting members of a homologous series of alkyl-phenoxypoly(ethyleneoxy)ethanols, which series can be represented by the general formula:

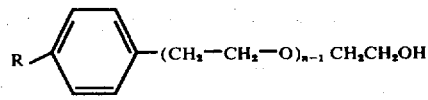

wherein R represents an alkyl substituent and $n$ represents the number of moles of ethylene oxide employed. These non-ionic surfactants include alkyl-phenoxypoly(ethyleneoxy)ethanols having alkyl groups containing between about 4 to about 240 ethyleneoxy units, such as the heptylphenoxypoly(ethyleneoxy)ethanols, nonylphenoxypoly(ethyleneoxy)ethanols and dodecylphenoxypoly(ethyleneoxy)ethanols. Other suitable non-ionic surfactants are the "Tweens," which is a trademark of Atlas Powder Company denoting polyoxyalkylene derivatives of hexitol (including sorbitans, sorbides, mannitans and mannides), partial long chain fatty acid esters, such as the polyoxyalkylene derivatives of sorbitan monolaurate, sorbitan monopalmitate, sorbitan monostearate, sorbitan tristearate, sorbitan mono-oleate and sorbitan tri-oleate; the "Pluronics," which is a trademark of Wyandotte Chemicals Corporation denoting condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl, dodecyl, or tetradecyl mercaptan, or with alkylthiophenols wherein the alkyl substituent contains from 6 to 15 carbon atoms; ethylene oxide derivatives of long-chain carboxylic acids, such as lauric, myristic, palmitic or oleic acid, or mixtures of acids, such as tall oil, and ethylene oxide derivatives of long-chain alcohols such as octyl, decyl, lauryl or cetyl alcohol.

Among the anionic surfactants suitable for use in the present invention are the higher molecular weight sulfates and sulfonates, e.g., sodium and potassium alkyl sulfates, aryl sulfates, and alkyl-aryl sulfates and sulfonates, including sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate; higher fatty alcohols, e.g., stearyl alcohol, lauryl alcohol, and the like, which have been ethoxylated and sulfonated; dialkyl esters of alkali metal sulfosuccinic acid salts, e.g., sodium diamyl sulfosuccinate, sodium dihexyl sulfosuccinate and sodium di-octyl sulfosuccinate; and formaldehydenaphthalenesulfonic acid condensation products.

Most preferred for the styrene-butadiene emulsions of the instant invention are the anionic surfactants which are fatty acid soaps and especially water-soluble long-chain fatty soaps, such as sodium or potassium laurate, myristate, palmitate, oleate, stearate and the like. The water-soluble sodium or potassium soaps of tall oil and the rosin soaps, including disproportionated rosin soaps, also can be used. If desired a secondary emulsifier can be present, which can be a conventional synthetic detergent. Examples of secondary emulsifiers include the alkali metal sulfonates derived from aryl sulfonic acids, e.g., sodium alkyl-naphthalene sulfonates.

The instant invention is most applicable in preparing copolymeric synthetic rubbers, e.g., copolymers of the various 1,3-butadienes, such as 1,3-butadiene, isoprene, chloroprene, piperylene, 2,3-dimethyl-1,3-butadiene, and the like, in conjunction with from about 10 to about 50 percent, by weight, (preferably about 20 to about 30 percent) of a compound which contains a $CH_2 = C<$ group wherein at least one of the disconnected valences is attached to an electroactive substituent, i.e., a substituent which substantially increases the electrical dissymmetry or polar character of the molecule. Examples of compounds containing the aforementioned substituent are the aryl olefins, such as styrene, methyl styrene, vinyl toluene, vinyl naphthalene, the alpha methylene carboxylic acids and esters, nitriles and amides thereof, such as acrylic acid, methylacrylic acid, methyl methacrylate, acrylonitrile, methacrylonitrile and methacrylamide; isobutylene; methylvinyl ether; and methylvinyl ketone. In some instances, the monomeric material can be a compound containing a single $CH_2 = C<$ substituent or a mixture of such compounds. The preferred compound of this class is styrene. The polymerizable monomeric materials useful herein can be referred to as mixtures of conjugated diolefins and monoethylenically unsaturated monomers which are copolymerizable therewith.

In addition, the instant invention contemplates telomers containing conjugated diolefins, the monomers described above, and the other monomers as described hereinafter. However, this third class of monomers should comprise no more than 40 percent by weight, preferably about 10 percent to about 20 percent, by weight, of the total amount of monomers utilized. In other words, the diolefin and the first list of monomers should be predominant, particularly, where butadiene and an aryl olefin, the most preferred system herein, are involved.

Examples of such other monomers which may be copolymerizable include: the alkyl acrylates and methacrylates, vinyl and vinylidene halides, allyl esters of saturated monocarboxylic acids, vinyl esters, vinyl ethers, dialkyl esters of mono-ethylenically unsaturated dicarboxylic acids, ethylenically unsaturated mono- and polycarboxylic acids, and amides of the aforementioned acids. A detailed listing of such monomers which are well known in the art is set forth in U.S. Pat. No. 3,637,563, at cols. 3, 4, and 5, and is hereby incorporated in and made a part hereof by reference.

The instant improved process involves the discovery that by preparing these polymers utilizing about 0.1 to about 2.0 percent, by weight, preferably about 0.8 to about 1.2 percent, of a lypophillic initiator, and about 0.01 to about 0.2 percent of a hydrophillic initiator, such amounts being based on the total monomer content, stable, high solids emulsions can result. The term "lypophillic initiator" is meant to encompass those initiators which are soluble in oil, such as castor oil, tall oil and the like. Examples of such lypophillic initiators include alkyl peroxides, such as tert-butyl peroxide, cumyl peroxide; acyl peroxides, such as acetyl peroxide, butyrl peroxide, benzoyl peroxide, chloro- or bromo-substituted benzoyl peroxide; hydroperoxides and ketone peroxides such as tert-butyl hydroperoxide, cumene hydroperoxide, methyl ethyl ketone peroxides; peresters and peroxy carbonates, such as tert-butyl peracetate and tert-butyl perbenzoate; and dibenzoyl peroxydicarbonate. Other lypophillic azonitriles, alkyl peroxides, acyl peroxides, hydroperoxides, ketone peroxides, peresters, and peroxy dicarbonates which may be used are set out in Table II-3 to II-51 in the book *Polymer Handbook*, edited by J. Brandrup and E. H. Immergut, and published in 1965 by Interscience Publishers, New York City, N.Y.

The term "hydrophillic initiators" generally means a water-soluble initiator and includes such initiators as hydrogen peroxide, sodium peroxide, ammonium persulfate, sodium persulfate, lithium persulfate, potassium persulfate, and other water-soluble persulfates, perphosphates, perchlorates, and perborates.

Also included are water-soluble redox systems such as hydrogen peroxide or persulfates, perborates, perphosphates, perchlorates and the like, together with iron salts, titanous salts; zinc or sodium formaldehyde sulfoxylate; bisulfites and metabisulfites; arylphosphinic acids, and the like.

The most preferred lypophillic initiators are acetyl peroxide, isobutyrl peroxide, benzoyl peroxide, diisopropyl peroxy dicarbonate, ethyl tert-butyl peroxalate, with benzoyl peroxide being highly preferred.

The most preferred hydrophillic initiators are ammonium persulfate, sodium persulfate, potassium persulfate, and hydrogen peroxide, with a potassium persulfate being highly preferred.

The polymerization of the monomers of the instant invention is conducted in the presence of the above catalysts which are added in a total amount to provide substantially complete monomer conversion to produce a polymer emulsion having total solids content in the range of about 50 to about 75 percent or higher, by weight, and preferably in the range of about 60 to about 75 percent, by weight. Minor amounts, up to about 35 percent, by weight, based upon the initiator content, of other free radical initiators may also be utilized.

The high solids emulsions produced according to the instant invention have workable viscosities, good shelf stability and are higher in solids content and conversion than those obtainable by any previously known techniques.

The catalysts themselves may be added by various methods. For example, they may be mixed with the monomer pre-emulsion a relatively short time prior to the polymerization process, or they may be added concurrently with the monomer pre-emulsion from different addition funnels. The lypophillic and hydrophillic initiators are preferably fed from different funnels. Addition rates for initiators may be essentially the same as, or may be different from, the monomer pre-emulsion addition rate and may be added continuously or intermittently. In addition, substantially all of the catalyst, or a portion thereof, may be added initially to the reaction medium.

Preferably, however, in order to insure good conversion to stable copolymer emulsions having optimum solids contents, at least about 10 percent by weight, of the total catalyst employed, preferably from about 15 to about 20 percent, should be added to the water, with the remainder being added to the polymer pre-emulsion or added concurrently therewith from separate addition funnels.

Chain transfer agents may be added to the reaction mixture herein to control molecular weight. These agents are well known in the art and are generally selected from allyl and aryl mercaptans and phenols.

They are added where used in amounts up to about 2 percent, based on the monomer weight.

The polymerization temperature will generally range from about room temperature (i.e., ambient temperature) or lower to about 80° C. or above, and preferably from about 20° C. to about 60° C. This temperature can be varied as the polymerization proceeds towards substantial completion. Subatmospheric, atmospheric or superatmospheric pressures can be employed during allor part of the polymerization. Depending on the monomers and initiators employed, the reaction can be carried out, if desired, under an inert atmosphere, e.g., under an atmosphere of nitrogen, argon, or carbon dioxide. Polymerizations carried out at temperatures of 10° C. below the boiling point of the lowest boiling monomer present, or higher, are conveniently conducted in an inert atmosphere under superatmospheric pressure.

The time during which the monomer pre-emulsion and the catalyst are added to the water (in which polymerization is to occur), as well as the total reaction time can vary to a considerable extent, depending on such factors as the temperatures and pressures employed, the monomers and catalysts involved, the percent conversion and percent solids desired, and so forth. In general, however, the monomer pre-emulsion is added to the water at a rate such that polymerization continuously takes place without unreacted monomer buildup. This can be accomplished, for example, by adding the monomer pre-emulsion to the water over a period of from about 2 to about 8 hours or more, and preferably from about 4 to about 6 hours, together with the catalyst, the latter usually being dissolved in water at concentrations ranging from about 3 percent to about 12 percent, by weight, based on the total weight of the catalyst solution. The catalyst is conveniently added concurrently with the monomer pre-emulsion, i.e., if the monomer pre-emulsion is added over a 6-hour period, the catalyst solution is introduced approximately over the same period of time. However, small amounts of the catalyst solution can be added subsequent to the introduction of the last of the monomer pre-emulsion to ensure substantially complete polymerization, particularly where small amounts, e.g., up to about 0.5 percent, by weight, based on the total weight of monomers present, of odorous monomers, such as ethyl acrylate, butyl acrylate, and the like are apt to remain unpolymerized.

Following the addition of the last of the monomer pre-emulsion and catalyst, the polymer emulsion can be processed in any conventional manner.

After preparation, the copolymer emulsion may be stripped to remove excess or unreacted monomers. An antioxidant, such as phenyl beta napthylamine, is thereafter added to stabilize the emulsion. These antioxidants are well known in the art of styrene-butadiene latex preparation.

The emulsion may be used as is or may be coagulated by the addition of a metal salt.

Besides being useful in paint compositions, the novel high solids copolymer emulsions prepared by the novel method of the present invention are useful in film formation. They can also be used in producing elastomers, crosslinkable sealants and adhesives, in making foams, and in emulsion spinning processes.

The term "workable viscosities" or "acceptable viscosities" as used herein defines that range of viscosities of the high solids polymer emulsions within which the formulator or user of the polymer emulsion can effectively work, i.e., in blending, pumping, pouring, and the like operations. These ranges include viscosities slightly higher than that of water up to as high as 20,000 centipoises. In some instances, the preferred viscosity varies from 50 to 5,000 centipoises. The terms "shelf-stable polymer emulsions" and "stable latex polymers" as used herein denote emulsion polymer products which maintain their emulsion properties for a minimum of 1 day, preferably as long as 6 months and longer.

In the following examples, all parts and percentages are by weight, unless otherwise indicated.

EXAMPLE 1

75 parts of butadiene, 25 parts of styrene, 0.5 parts of a dodecyl mercaptan chain transfer agent, 5 parts of sodium lauryl sulfate, 0.3 parts potassium persulfate, and 40 parts of water were charged into a reactor equipped with a mechanical agitator, reflux condenser thermometer, and cooling coils. The reactor was sparged with nitrogen, and heated to 50° C. After 12 hours, the polymerization was stopped by adding 0.3 grams of hydroquinone. The high solids emulsion which resulted was steam stripped and an antioxidant was added at the 0.7 percent, by weight, level, based on the emulsion solids.

EXAMPLE 2

Example 1 was repeated except that isoprene was used in the place of butadiene, on a weight basis.

EXAMPLE 3

Example 1 was repeated except that the monomers were pre-emulsified with 20 parts of water and 5 parts of sodium lauryl sulfate. 0.1 part of potassium persulfate in 5.0 parts of water and 0.5 part benzoyl peroxide were added to the pre-emulsified monomers. 0.5 part of benzoyl peroxide and 20 parts of water were added to the reactor and the contents heated to 50° C. The pre-emulsion was added to the reactor over a 2 hour period, and the reactor was maintained at 50° C. for 10 hours. The resulting emulsion was worked up as in Example 1.

EXAMPLE 4

Example 3 was repeated except that 0.1 part of potassium persulfate in 5.0 parts of water and 0.5 part benzoyl peroxide were added to the reactor as separate streams over 2 hours.

The emulsion which resulted was stable and was worked up as in Example 1.

Table 1

| Process | Initiator | % Solids | % Conversion | Viscosity |
|---|---|---|---|---|
| Example 1 | Standard | 42 | 60 | High |
| Example 2 | Standard | 40 | 58 | High |
| Example 3 | Dual | 65 | 90 | Low |
| Example 4 | Dual | 70 | 99 | Low |

As can be seen from the above examples, when separate feeds of lypophillic and hydrophillic initiators are employed, high solids and conversion are possible in the finished emulsion.

What is claimed is:

1. In a process for producing conjugated diene/-monoethylenically unsaturated monomer-copolymer aqueous emulsions having solids contents in the range of 50–75 weight percent, wherein the monoethylenically unsaturated monomers contain a $CH_2=C<$ group from corresponding monomers by forming an aqueous monomer pre-emulsion by admixing at least one of the monomers with about 3 to about 50 percent, by weight, of water, based on the total weight of the monomers in the pre-emulsion, and a nonionic or anionic surfactant in an amount sufficient to emulsify said monomers, and the polymer subsequently formed therefrom, and adding the pre-emulsion to a polymerization reaction medium comprising free radical polymerization catalysts in initiating amounts in water, together with added free radical polymerization catalysts to complete the polymerization of the monomers and maintaining the rate of addition of the pre-emulsion at sufficient speed to maintain the addition polymerization, the improvement of which comprises utilizing as catalysts about 0.1 to about 2.0 percent, based on the total weight of the polymerizable monomers of a lypophilic initiator and about 0.01 to about 0.2 percent, based upon the total weight of the monomers of a hydrophilic initiator.

2. The process of claim 1 wherein the lypophilic initiator is selected from alkyl and acyl peroxides and hydroperoxides, peresters, peroxydicarbonates, azonitriles and ketone peroxides.

3. The process of claim 1 wherein the hydrophilic initiator is selected from persulfates, perborates, perphosphates, and perchlorates, hydrogen peroxide and its solutions, and redox systems containing these initiators.

4. The process of claim 1 wherein the emulsion is prepared from styrene and butadiene.

5. The process of claim 1 wherein the emulsion is prepared from styrene and isoprene.

6. The process of claim 1 wherein the lypophilic and hydrophilic initiators are added to the reactor separately.

7. The process of claim 1 wherein the polymerization is carried out at temperatures ranging up to about 80° C.

8. The process of claim 1, wherein a chain transfer agent is utilized.

* * * * *